United States Patent
Bartlett (10) Patent No.: US 9,735,585 B2
(45) Date of Patent: Aug. 15, 2017

(54) FOREIGN OBJECT DETECTION METHOD FOR WIRELESS CHARGING SYSTEMS

(71) Applicant: Google Inc., Mountain View, CA (US)

(72) Inventor: Scott Bartlett, Oakland, CA (US)

(73) Assignee: Google Inc., Mountain View, CA (US)

( * ) Notice: Subject to any disclaimer, the term of this patent is extended or adjusted under 35 U.S.C. 154(b) by 720 days.

(21) Appl. No.: 14/269,280

(22) Filed: May 5, 2014

(65) Prior Publication Data

US 2015/0318708 A1    Nov. 5, 2015

(51) Int. Cl.
  *H02J 17/00* (2006.01)
  *H02J 5/00* (2016.01)
  *H02J 7/02* (2016.01)

(52) U.S. Cl.
  CPC .............. *H02J 5/005* (2013.01); *H02J 7/025* (2013.01); *H02J 17/00* (2013.01)

(58) Field of Classification Search
  CPC ............. H02J 5/005; H02J 7/025; H02J 17/00
  USPC .................................................... 307/94–107
  See application file for complete search history.

(56) References Cited

U.S. PATENT DOCUMENTS

| | | | |
|---|---|---|---|
| 7,605,496 B2 | 10/2009 | Stevens et al. | |
| 2009/0278505 A1 | 11/2009 | Toya et al. | |
| 2009/0284227 A1* | 11/2009 | Mohammadian | G06K 7/0008 320/137 |
| 2010/0289341 A1* | 11/2010 | Ozaki | H02J 7/025 307/104 |
| 2011/0133569 A1* | 6/2011 | Cheon | H02J 17/00 307/104 |
| 2012/0256620 A1 | 10/2012 | Oettinger | |
| 2013/0257168 A1 | 10/2013 | Singh | |
| 2014/0132077 A1* | 5/2014 | Nalbant | H02M 1/38 307/104 |
| 2014/0300198 A1* | 10/2014 | Wakabayashi | H01F 38/14 307/104 |
| 2015/0035372 A1* | 2/2015 | Aioanei | H02J 7/025 307/104 |
| 2015/0155918 A1* | 6/2015 | Van Wageningen | H04B 5/00 307/104 |
| 2015/0249339 A1* | 9/2015 | Van Wageningen | H02J 5/00 307/104 |

FOREIGN PATENT DOCUMENTS

| | | |
|---|---|---|
| WO | 2005109597 A1 | 11/2005 |
| WO | 2014010049 A1 | 1/2014 |

OTHER PUBLICATIONS

ISR and Written Opinion for PCT/US2015/027068, mailed Jul. 7, 2015.

* cited by examiner

*Primary Examiner* — Brandon S Cole
(74) *Attorney, Agent, or Firm* — Morris & Kamlay LLP

(57) ABSTRACT

Systems, device and techniques are disclosed for measuring a parasitic load in an environment. A transmitter may transmit an out of order pulse such that a receiver with synchronous rectification circuitry rejects induced power from the transmitter based on the out of order pulse. The parasitic load is determined by measuring the amount of power induced by the transmitter while the intended receiver rejects the power subtracted by known inherent loss.

31 Claims, 5 Drawing Sheets

FOREIGN OBJECT DETECTION METHOD FOR WIRELESS CHARGING SYSTEMS

BACKGROUND

Traditionally, a wireless charging arrangement may use alternating magnetic fields to transfer power between a transmitter and a receiver by inducing current in the receiver. The induced current may be received by the receiver to operate a device (e.g., a mobile device) or to charge a battery, or both. However, the magnetic fields may induce currents in nearby conductive objects such as metal based objects. The result may be a reduced efficiency for the arrangement and may cause the nearby conductive objects to heat up as a result of the induced currents. As an example, an inductive charger may be configure to wirelessly charge a laptop while the inductive charger is placed within 5 feet of the laptop. As the inductive charger is wirelessly charging the laptop, a metal cup may also be within five feet of the inductive charger such that the metal cup draws charge from the inductive charger and heats up.

BRIEF SUMMARY

According to implementations of the disclosed subject matter, a transmitter may transmit an out of order pulse where a receiver configured to receive an in-order pulse rejects power transmitted by the transmitter based on the out of order pulse. An out of order pulse may be a pulse with a phase that is at least 100 degrees different than an in-order pulse. The receiver may be configured to convert alternating current to direct current using synchronous rectification such that an out of order pulse enables the receiver to reject power. The amount of accepted power transmitted by the transmitter may be determined while the receiver rejects power transmitted by the transmitter. The amount of accepted power may be determined by detecting a back electromagnetic field such as via the transmitter's transmission coil, a part of the transmission coil, or a secondary coil separate from the transmission coil. Alternatively or in addition, the accepted power may be determined by measuring the current or voltage sent through one or more of the transmission coils within the transmitter. An amount of parasitic load in the environment may be determined based at least on the accepted power and a known transmission loss. A response action such as a stop transmission, alert, or modify transmission may be taken based on the parasitic loss.

According to implementations of the disclosed subject matter, a means for a transmitter to transmit an out of order pulse is provided, where a receiver configured to receive an in-order pulse rejects power transmitted by the transmitter based on the out of order pulse. An out of order pulse may be a pulse with a phase that is at least 100 degrees different than an in-order pulse. Means may be provided for a receiver to convert alternating current to direct current using synchronous rectification such that an out of order pulse enables the receiver to reject power. The amount of accepted power transmitted by the transmitter may be determined while the receiver rejects power transmitted by the transmitter. The amount of accepted power may be determined by detecting a back electromagnetic field such as via the transmitter's transmission coil, a part of the transmission coil, or a secondary coil separate from the transmission coil. Alternatively or in addition, the accepted power may be determined by measuring the current or voltage sent through one or more of the transmission coils within the transmitter. An amount of parasitic load in the environment may be determined based at least on the accepted power and a known transmission loss. A response action such as a stop transmission, alert, or modify transmission may be taken based on the parasitic loss.

Systems and techniques according to the present disclosure allow determination of a parasitic load via measuring the amount of power provided to loads other than the receiver. Additional features, advantages, and implementations of the disclosed subject matter may be set forth or apparent from consideration of the following detailed description, drawings, and claims. Moreover, it is to be understood that both the foregoing summary and the following detailed description include examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Traditional, wireless charging systems use alternating magnetic fields to transfer power between a transmitter and a receiver by inducing current in the receiver. These magnetic fields can also induce parasitic currents in nearby conductors, typically metal bodies, causing heating of the conductor and a loss of available power in the inductive charging system, thus reducing efficiency. It may be beneficial to know the amount of parasitic loss so that an appropriate response action can be taken based on the amount of loss. As an example, if the parasitic loss is an above a predetermined threshold, then the inductive power transfer may be placed on hold until the external conductor is removed from the environment. Parasitic loads may be unfavorable for any applicable reason such as an undesirable amount of wasted power, unsafe amount of heat transferred to the external conductor, and/or an insufficient amount of power provided to the receiver such that the receiving device cannot be properly charged.

Additionally, traditional charging systems convert alternating current to direct current by using full-wave rectification to make use of the entire alternating current cycle. When using four diodes in such a system, however, there are some power losses inherent in the system because of the voltage drop across the diodes.

According to implementations of the disclosed subject matter, synchronous rectification may be used via metal-oxide-semiconductor field-effect transistors (MOSFETs), insulated-gate bipolar transistors (IGBTs) for low-loss switching, a straight bi-polar transistor, or any applicable low-loss switching mechanism. In traditional systems, no preference is made for the polarity of the AC signal such that you could rotate the AC signal by 180 degrees (by, for example, swapping the leads on the transmit or receive coils) and the system would operate just the same. However, according to implementations of the disclosed subject matter the system may operate based on polarity, such that it may make use of phase information to either trigger or not trigger the rectification circuitry, thus allowing the transmitter to switch the receiving load in and out of the circuit so that measurements can be made to determine parasitic losses in the system.

Figure 4:
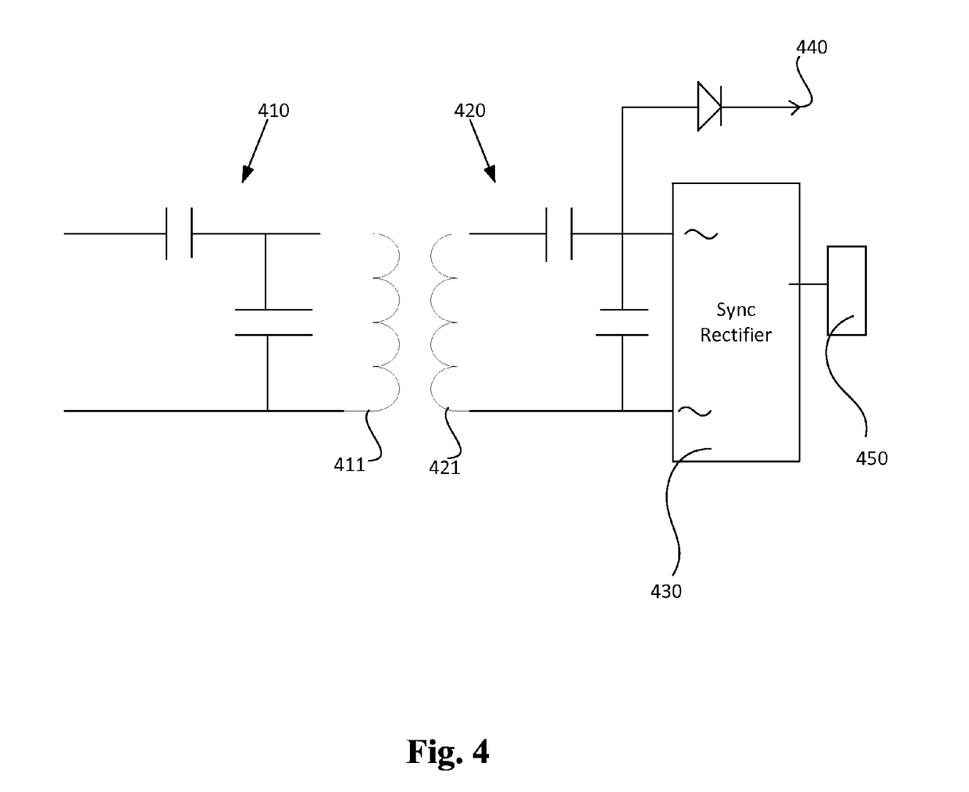
FIG. 4 shows an example illustration of synchronous rectifier, according to an implementation of the disclosed subject matter.

As an example illustration, as shown in FIG. 4 a transmitter 410 may contain circuitry configured to induce a current via coil 411. A receiver 420 may be proximate to the transmitter 410 such that it receives the induced charge via coil 421. The receiver may contain a synchronous rectifier 430 that enables the receiver to receive a charge, by triggering the rectification circuitry, when the received pulses are cyclical (i.e., in order, as disclosed herein). If the rectification circuitry is triggered then power induced by the transmitter maybe delivered to a power load 450 via the synchronous rectifier 430. The synchronous rectifier 430 may not trigger the rectification circuitry when the received pulses are not cyclical (i.e., out of order, as disclosed herein), effectively preventing the power load 440 from receiving a charge from the transmitter.

As an example of a receiver rejecting power based on an out of order pulse, during startup of the charging operation, a transmitter may transmit a positive pulse towards a receiver. The receiver may receive the positive pulse and trigger the synchronous rectification circuitry, for example through high-impedance taps. Power to drive the receiver circuitry 440 may be derived through a half-wave rectifier such as that in a diode. The positive pulse may be followed by a negative pulse transmitted by the transmitter, to complete a full cycle. Several additional cycles may trigger power transfer. As disclosed herein, this pulse chain may be stopped to detect parasitic loads.

Figure 3:
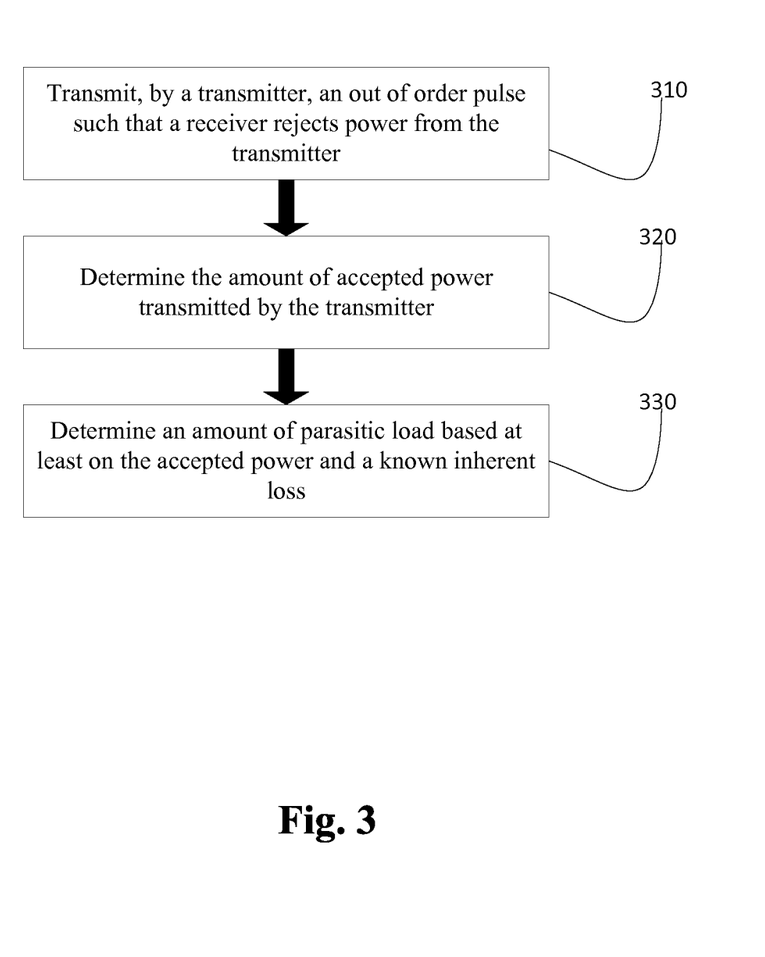
FIG. 3 shows an example process for determining a parasitic loss, according to an implementation of the disclosed subject matter.

According to implementations of the disclosed subject matter, a transmitter may be configured to transmit cyclical alternating positive and negative pulses to provide power to a receiving device. The transmitter may contain one or more coils to facilitate the power transmissions. As shown in FIG. 3, at step 310, the transmitter may transmit an out of order pulse such that the receiver receives the out of order pulse. As a specific example, the transmitter may transmit cyclical pulses towards the receiver such as a positive, negative, positive, negative set of pulses. Subsequent to the last negative pulse, the transmitter may transmit another negative pulse. This negative pulse is considered an "out of order" pulse as disclosed herein, since the next pulse in the cycle would be a positive pulse. The synchronous rectification circuitry at the receiver may reject power from the transmitter based on the out of order pulse as the circuitry may expect an in-order signal to continue charging operations. As a specific example, an out of order pulse may be a pulse that is more than 100 degrees different in phase than an expected pulse. As a more specific example, a transmitter may transmit a cycle of pulses such as a 0 degree pulse, followed by a 180 degree pulse, followed by a 0 degree pulse. The next subsequent pulse in the cycle would be a 180 degree pulse. However, an out of order pulse may be a 10 degree pulse (i.e., 170 degrees different than the expected 180 degree pulse). According to implementations, the transmitter may continue to provide inductive charge such that although the receiver itself may reject the power transfer, the transmitter may not stop providing inductive charge.

As shown at step 320 in FIG. 3, an amount of accepted power transmitted by the transmitter may be calculated. The amount of accepted power may correspond to power accepted by the environment such as via parasitic loads (e.g., metallic objects, electricity draining objects, etc.), via transmission parts, via receiver parts (e.g., may be when the receiver rejects a substantial portion of the power however cannot reject all the power), or the like.

The amount of accepted power accepted by the environment may be calculated by measuring the current or voltage dissipated by the transmitter. The voltage or current dissipated by the transmitter represents the accepted power as, when the transmitter dissipates a current/voltage, then at least a portion of that current/voltage is transformed to power that is accepted by one or more objects in the environment.

Figure 6A:
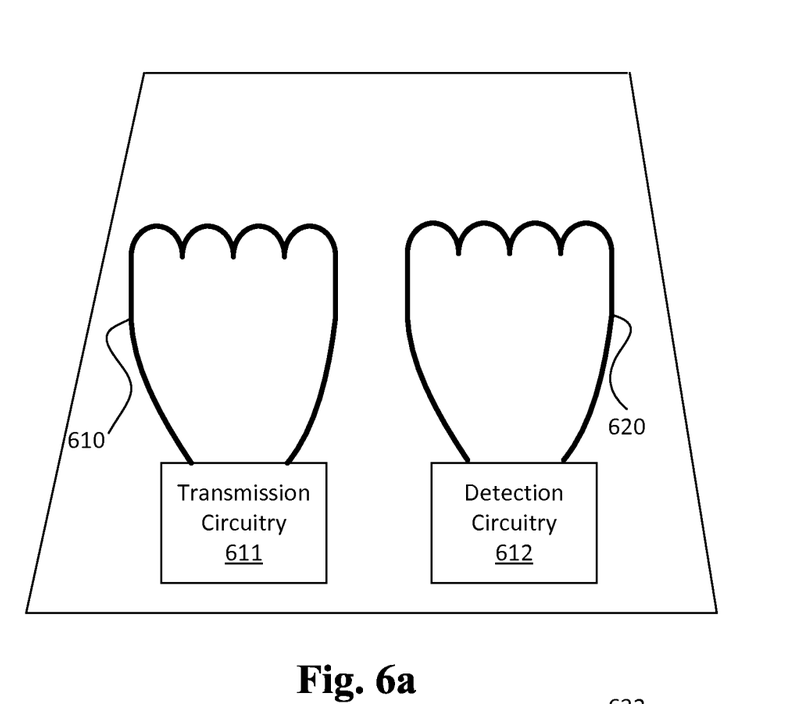
FIG. 6a shows an example illustration of inductive coils, according to an implementation of the disclosed subject matter.
Figure 6B:
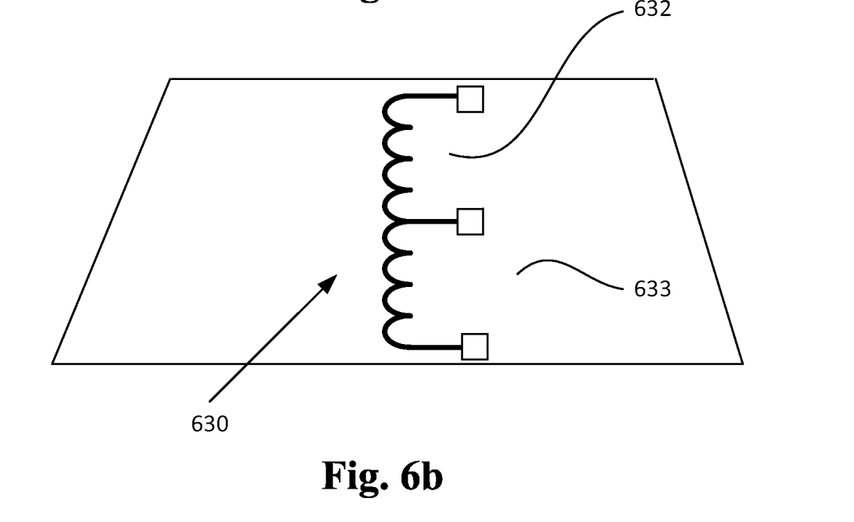
FIG. 6b shows an example illustration of a center tapered inductive coil, according to an implementation of the disclosed subject matter.

Alternatively or in addition, the amount of accepted power may be determined by detecting a back electromagnetic field. A back electromagnetic field may be the voltage or electromotive that pushes against the current which induces it. It may be caused by a changing electromagnetic field. Power generated by the back electromagnetic field may be equal or direction proportional to the amount of power accepted by the environment. The back electromagnetic field may be detected by a transmitter's transmission coil. As an example, as shown in FIG. 6a, coil 610 may generate an electromagnetic field to induce power to a receiver. Additionally, the coil 610 may also detect a back electromagnetic field. Alternatively or in addition, the back electromagnetic field may be detected by a secondary coil within a transmitter, separate from the coil that transmits power to a receiver. As an example, as shown in FIG. 6a, coil 610 may generate an electromagnetic field to induce power to a receiver and coil 620 may detect a back electromagnetic field. As shown, coil 610 may be connected to transmission circuitry 611 that provides power to the coil 610 for transmission. Coil 620 may be connected to detection circuitry that is configured to calculate or analyze a back electromagnetic field received by the coil 620. Alternatively or in addition, the transmitter may contain a center tapped transmission coil such that a portion of the center tap of the coil is grounded. Here, the transmission may occur via a portion of the center tapped transmission coil (e.g., half the coil) and the other half of the transmission coil may measure the back electromagnetic field. As an example, as shown in FIG. 6b, a center tapped coil 630 may be center tap grounded and may transmit via the top portion 632 and detect a back electromagnetic field via the bottom portion 633. In general, when a coil as described herein detects or measures an electric field, the detection and/or measurement may be performed by various circuitry electrically connected to the coil, which detects and/or measures one or more currents induced in the coil by the electric field, as is known in the art.

As shown in FIG. 3 at step 330 an amount of parasitic load may be determined based on the accepted power and known inherent loss in the environment. The known inherent loss may be calculated based on the transmitter, receiver, or any other known entity. The transmitter may be previously characterized such that the amount of power absorbed/lost by the transmitter during transmission are known. The power absorbed/lost may be a result of the components that make up the transmitter such as metal components, circuitry, wiring, etc. As an example, a transmitter may contain a metal housing such that the electronic components are contained within the metal housing. As a result of the housing having conductive properties, a part of the power transmitted by the transmitter may be absorbed by the metallic housing. According to implementations of the disclosed subject matter, the amount of such absorbed transmitted power may be known. Similarly, the receiver may be previously characterized such that the amount of power absorbed by the receiver during transmission, while the receiver does not accept power from the transmitter (i.e., due to an out of order pulse). The receiver may not accept power for the duration of one or more out of order pulses (e.g., there may be between 1 and N out of order pulses and, during the transmission of those pulses, the receiver may not accept power). Alternatively, an out of order pulse may be detected by a receiver and the receiver may not accept power for a given period of time (e.g., a predetermined amount of time, an amount of time determined based on the out of order pulse, etc.). Alternatively or in addition, an out of order pulse may cause a receiver to not accept power and the receiver may continue to not accept power until an in order pulse or a distinct pulse, indicating that the receiver should accept power, is received. The power absorbed/lost may be a result of the components that make up the receiver such as metal components, circuitry, wiring, etc. As an example, a receiver may contain a metal housing such that the respective electronic components are contained within the metal housing. As a result of the housing having conductive properties, a part of the power transmitted by the transmitter may be absorbed by the metallic housing of the receiver. According to implementations of the disclosed subject matter, the amount of such absorbed transmitted power may be known. The known losses may be calculated at any point such as during manufacturing, post manufacturing, during installation, or the like.

The amount of parasitic load may be determined via any applicable calculation such as subtracting the amount of known inherent loss from the accepted power. As a specific example, a transmitter may be known to have an inherent loss of 50 milliwatts and the amount of accepted power transmitted by the transmitter while a receiver rejected power was 150 milliwatts. Accordingly, a determination may be made that the parasitic load in the environment is 100 milliwatts (i.e., 150 milliwatts (accepted)–50 milliwatts (known inherent)). As another specific example, a transmitter may be known to have an inherent loss of 40 milliwatts and a receiver may be known to have an inherent loss of 30 milliwatts while it rejects power from a transmitter (e.g., as a result of an out of sync pulse). The amount of accepted power transmitted by the transmitter while the receiver rejects power may be 200 milliwatts. Accordingly, a determination may be made that the parasitic load in the environment is 130 milliwatts (i.e., 200 milliwatts (accepted)–40 millwatts (known inherent transmitter)–30 milliwatts (known inherent receiver)).

According to implementations of the disclosed subject matter, a response action may be taken based on a determined amount of parasitic loss. The response action may be a stop transmission action, a modify transmission action, an alert action, or the like. A stop transmission action may shut off power transfer by the transmitter such that power is prevented from being transmitted out of the transmitter (i.e., to either the receiver or any parasitic load). As an example, a stop transmission threshold may be 60 milliwatts such that if the amount of detected parasitic loss exceeds 60 milliwatts then power transmission by the transmitter is stopped. A modify transmission action may be any applicable action such as a reduced/increased amount of power transmitted by the transmitter, a more directed power transfer, a change in frequency of transfer, or the like. As a specific example, if a modification threshold for parasitic loss is reached, then the transmitter may modify the frequency of pulse cycles. The modification may result in an intended receiver to receive more of the transferred power and parasitic loads to receive less or no power. An alert action may be any notification based action and may include an instruction, a warning, request for a user action, or the like. As a specific example, the parasitic loss in an environment may be determined to be above a threshold amount. Accordingly, a notification may be sent to a user account (e.g., email account SMS message, application notification, etc.) requesting the user to place either the transmitter or receiver in a location other than their respective current locations. As another example, the parasitic loss in an environment may be determined to be above a threshold amount. Based on the determination a warning may be displayed on the transmitter alerting a user about potentially alarming charged parasitic loads.

Figure 5:
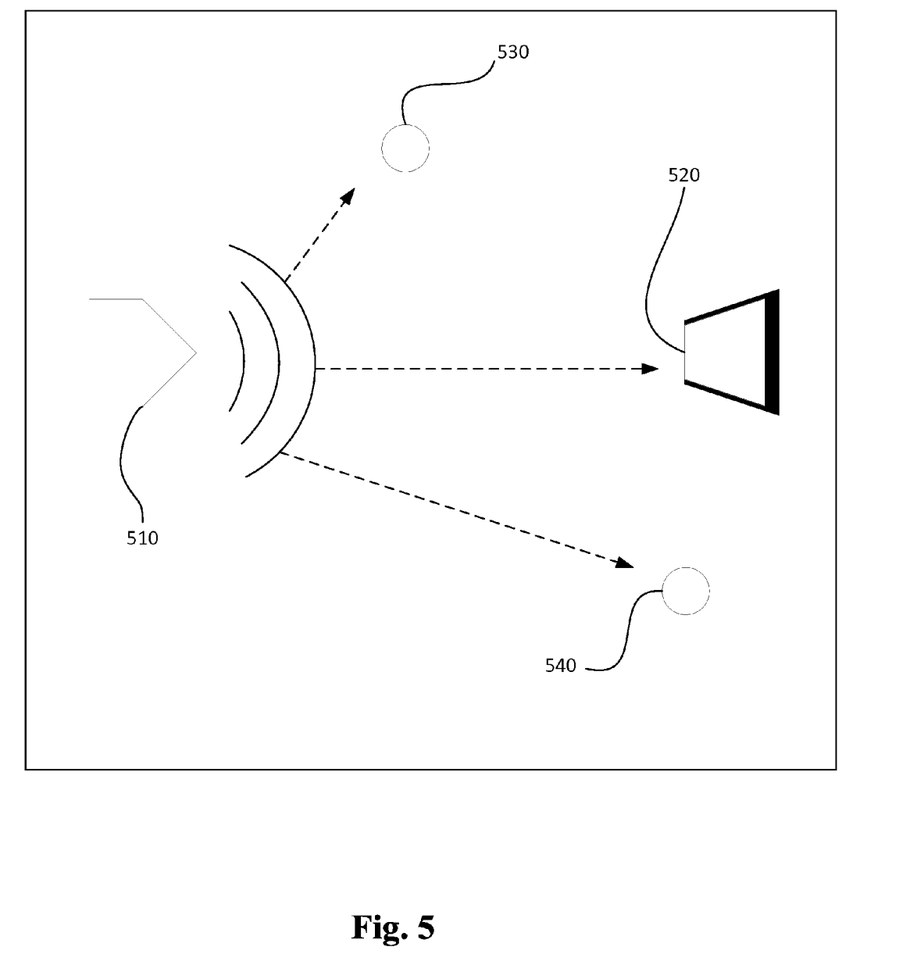
FIG. 5 shows an example illustration of a parasitic load, according to an implementation of the disclosed subject matter.

As an illustrative example of the disclosed subject matter, as shown in FIG. 5, a transmitter 510 may transmit synchronous pulses to induce power into an intended receiver 520. Here, the intended FIG. 520 may be the figure that the transmitter 510 is configured to charge. At a certain point, the transmitter 510 may transmit an out of order pulse such as, for example, a negative pulse followed by a negative (such that a positive pulse would have been an in order pulse). Based on the out of order pulse, the synchronous rectification circuitry may not trigger such that the receiver 520 may not receive power from the transmitter 510. The transmitter 510 may continue to transmit pulses and a back electromagnetic field may be recorded by a coil within the transmitter. The back electromagnetic field may indicate the amount of power induced by the transmitter while the receiver 520 does not accept the power from the transmitter 510. Essentially, since the intended receiver 520 does not accept power from the transmitter 510, as a result of the out of order pulse, power supplied by the transmitter 510 may be received by one or more parasitic loads. Accordingly, the back electromagnetic field may indicate that parasitic loads 540 and 530 are drawing power from the transmitter 510 and, thus, a parasitic power amount may be determined. If the determined parasitic power amount is above a threshold then the transmitter 510 may stop transmitting power.

Figure 1:
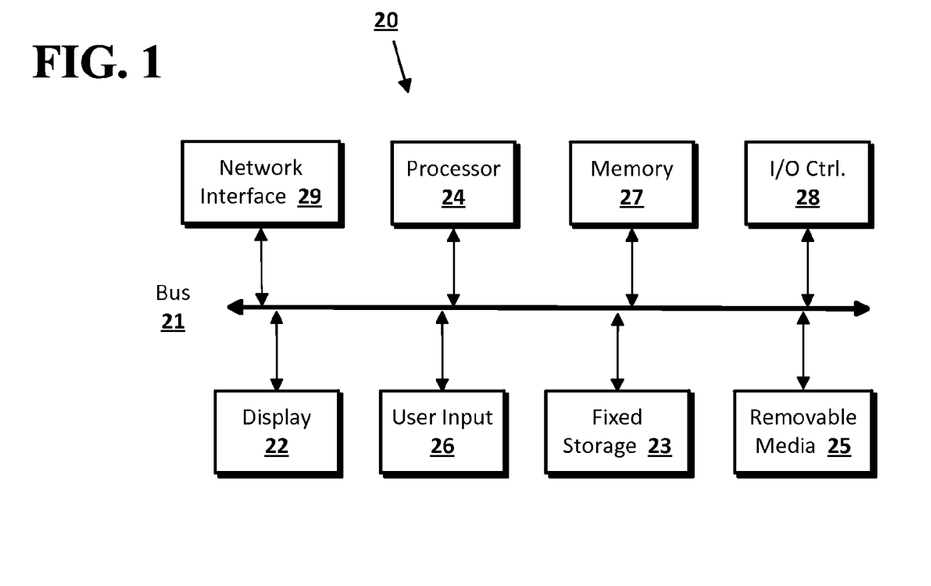
FIG. 1 shows a computer according to an implementation of the disclosed subject matter.

Implementations of the presently disclosed subject matter may be implemented in and used with a variety of component and network architectures. As an example, a transmitter or a receiver may be controlled using the computer or network architectures disclosed herein. As another example, a transmitter may be used to charge a computer or network device, as disclosed herein. FIG. 1 is an example computer 20 suitable for implementing implementations of the presently disclosed subject matter. A smart power device may implement a computer architecture as disclosed here or may apply any applicable architecture to accomplish the disclosed techniques. The computer (e.g., microcomputer) 20 includes a bus 21 which interconnects major components of the computer 20, such as a central processor 24, a memory 27 (typically RAM, but which may also include ROM, flash RAM, or the like), an input/output controller 28, a user display 22, such as a display or touch screen via a display adapter, a user input interface 26, which may include one or more controllers and associated user input or devices such as a keyboard, mouse, WiFi/cellular radios, touchscreen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
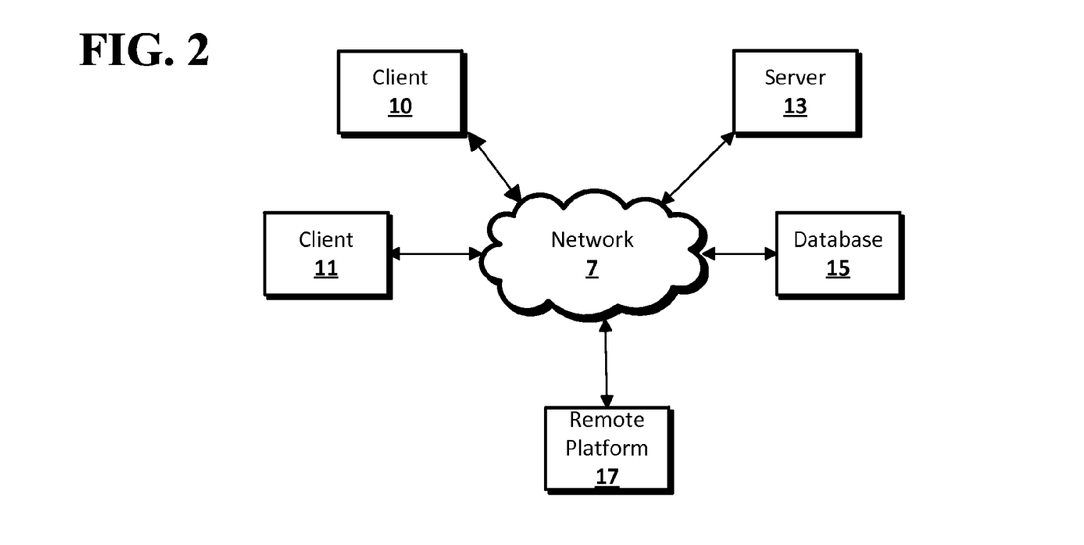
FIG. 2 shows a network configuration according to an implementation of the disclosed subject matter.

FIG. 2 shows an example network arrangement according to an implementation of the disclosed subject matter. One or more clients 10, 11, such as smart power devices, microcomputers, local computers, smart phones, tablet computing devices, and the like may connect to other devices via one or more networks 7 (e.g., a power distribution network). The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:
   transmitting, by a transmitter, an out of order pulse that causes a receiver to reject power transmitted by the transmitter for a period of time based on the out of order pulse that has a different phase with a difference of degrees from an in-order pulse;
   determining the amount of accepted power transmitted by the transmitter while the receiver rejects power transmitted by the transmitter; and
   determining an amount of parasitic load in the environment based at least on the accepted power and a known inherent loss.

2. The method of claim 1, wherein determining the amount of accepted power comprises detecting a back electromagnetic field.

3. The method of claim 2, wherein the back electromagnetic field is detected by the transmitter's transmission coil.

4. The method of claim 2, wherein the back electromagnetic field is detected by a secondary coil separate from the transmission coil.

5. The method of claim 2, wherein the back electromagnetic field is detected by a portion of the transmitters transmission coil.

6. The method of claim 1, wherein determining the amount of accepted power comprises measuring the current or voltage sent through one or more transmitter coils.

7. The method of claim 1, wherein the phase of the out of order pulse is at least 100 degrees different then the in-order pulse.

8. The method of claim 1, further comprising converting, by the receiver, alternating current to direct current using synchronous rectification.

9. The method of claim 8, further comprising implementing, by the receiver, synchronous rectification via at least one component selected from the group consisting of: a metal-oxide-semiconductor field-effect transistor, an insulated-gate bipolar transistor, and a straight bi-polar transistor.

10. The method of claim 8, further comprising implementing, by the receiver, synchronous rectification via a low-loss switching mechanism.

11. The method of claim 1, wherein the receiver rejects power transmitted by the transmitter based on the out of order pulse by not triggering a rectification circuitry.

12. The method of claim 1, wherein the receiver rejects power transmitted by the transmitter based on the out of order pulse by deactivating a rectification circuitry.

13. The method of claim 1, wherein the known inherent loss is based on inherent transmitter loss.

14. The method of claim 1, further comprising taking a response action based on the determined amount of parasitic loss.

15. The method of claim 14, wherein the response action is at least one selected from the group consisting of: a stop transmission, an alert, and a modify transmission.

16. A system comprising:
   a transmitter, the transmitter configured to:
      transmit an out of order pulse that has a different phase with a difference of degrees then an in-order pulse;
      determine the amount of accepted power transmitted by the transmitter;
   a receiver, the receiver configured to:
      reject power transmitted by the transmitter based on the out of order pulse; and
   a processor configured to:
      determine an amount of parasitic load in the environment based at least on the accepted power and a known inherent loss.

17. The system of claim 16, wherein the amount of accepted power is determined while the receiver rejects power transmitted by the transmitter.

18. The system of claim 16, wherein determining the amount of accepted power comprises detecting a back electromagnetic field.

19. The system of claim 18, wherein the back electromagnetic field is detected by the transmitter's transmission coil.

20. The system of claim 18, wherein the back electromagnetic field is detected by a secondary coil separate from the transmission coil.

21. The system of claim 18, wherein the back electromagnetic field is detected by a portion of the transmitters transmission coil.

22. The system of claim 16, wherein determining the amount of accepted power comprises measuring the current or voltage sent through one or more transmitter coils.

23. The system of claim 16, wherein the phased of the out of order pulse is at least 100 degrees different then the in-order pulse.

24. The system of claim 16, wherein the receiver converts alternating current to direct current using synchronous rectification.

25. The system of claim 24, wherein the receiver implements synchronous rectification via at least one selected from the group consisting of: a metal-oxide-semiconductor field-effect transistor, an insulated-gate bipolar transistor, and a straight bi-polar transistor.

26. The system of claim 24, further comprising implementing, by the receiver, synchronous rectification via a low-loss switching mechanism.

27. The system of claim 16, wherein the receiver rejects power transmitted by the transmitter based on the out of order pulse by not triggering a rectification circuitry.

28. The system of claim 16, wherein the receiver rejects power transmitted by the transmitter based on the out of order pulse by deactivating a rectification circuitry.

29. The system of claim 16, wherein the known inherent loss is based on inherent transmitter loss.

30. The system of claim 16, further configured to taking a response action based on the determined amount of parasitic loss.

31. The system of claim 30, wherein the response action is at least one selected from the group consisting of: a stop transmission, an alert, and a modify transmission.

* * * * *